(12) United States Patent
Dou et al.

(10) Patent No.: US 8,807,618 B2
(45) Date of Patent: Aug. 19, 2014

(54) CONNECTING DEVICE FOR MULTIFUNCTIONAL BOX AND VEHICLE COMPRISING THE SAME

(75) Inventors: Yishi Dou, Shenzhen (CN); Minqing Yao, Shenzhen (CN); Xiaodong Xu, Shenzhen (CN); Jinjiang Liu, Shenzhen (CN)

(73) Assignees: Shenzhen BYD Auto R&D Company Limited (CN); BYD Company Limited (CN)

( * ) Notice: Subject to any disclaimer, the term of this patent is extended or adjusted under 35 U.S.C. 154(b) by 0 days.

(21) Appl. No.: 13/580,035

(22) PCT Filed: Feb. 14, 2011

(86) PCT No.: PCT/CN2011/070978
§ 371 (c)(1),
(2), (4) Date: Aug. 20, 2012

(87) PCT Pub. No.: WO2011/100891
PCT Pub. Date: Aug. 25, 2011

(65) Prior Publication Data
US 2012/0313390 A1 Dec. 13, 2012

(30) Foreign Application Priority Data
Feb. 21, 2010 (CN) .......................... 2010 1 0114936

(51) Int. Cl.
*B60R 11/02* (2006.01)
(52) U.S. Cl.
CPC ...................................... *B60R 11/02* (2013.01)
USPC .................. 296/1.07; 312/223.2; 248/221.11

(58) Field of Classification Search
USPC .............. 296/1.07, 37.12, 70; 248/27.1, 27.3, 248/220.21, 220.22, 221.11, 222.11, 248/222.12; 312/7.1, 223.2, 332.1; 439/159, 160
See application file for complete search history.

(56) References Cited

U.S. PATENT DOCUMENTS 4,577,818 A * 3/1986 Clarisse ....................... 248/27.3
4,726,632 A * 2/1988 Pori .............................. 312/7.1
(Continued)

FOREIGN PATENT DOCUMENTS

| CN | 1110047 A | 10/1995 |
|---|---|---|
| CN | 2690932 Y | 4/2005 |
| CN | 2779806 Y | 5/2006 |
| CN | 2833718 Y | 11/2006 |

(Continued)

OTHER PUBLICATIONS

International Search Report for Application No. PCt/CN2011/070978 dated May 26, 2011.

*Primary Examiner* — Glenn Dayoan
*Assistant Examiner* — Jason S Daniels
(74) *Attorney, Agent, or Firm* — Lerner, David, Littenberg, Krumholz & Mentlik, LLP (57) ABSTRACT

A connecting device adapted for connecting a multifunctional box with a vehicle multimedia system may be provided. The connecting device may comprise a shell for holding the multifunctional box having a first open end portion and a second end portion configured with an interface, via which the multifunctional box is electrically connected with the vehicle multimedia system in a releasable manner; a locking unit formed on at least a lateral side between the first open portion and the second end portion for releasably locking the multifunctional box; and a release unit formed on the shell to release the inserted multifunctional box when pressed. A vehicle comprising the connecting device may also be provided.

20 Claims, 7 Drawing Sheets

(56) References Cited

U.S. PATENT DOCUMENTS

| | | | |
|---|---|---|---|
| 4,947,661 A * | 8/1990 | Yoshida | 70/57 |
| 4,955,678 A | 9/1990 | Kobayashi | |
| 5,020,151 A * | 5/1991 | Sampei et al. | 455/345 |
| 5,073,978 A * | 12/1991 | Mastrippolito | 455/346 |
| 5,493,479 A | 2/1996 | Takahashi | |
| 5,560,572 A * | 10/1996 | Osborn et al. | 248/27.3 |
| 5,779,197 A * | 7/1998 | Kim | 248/27.1 |
| 2003/0160134 A1* | 8/2003 | Upson et al. | 248/27.3 |

FOREIGN PATENT DOCUMENTS

| | | |
|---|---|---|
| CN | 2930235 Y | 8/2007 |
| CN | 200953709 Y | 9/2007 |
| CN | 200992174 Y | 12/2007 |
| CN | 201048043 Y | 4/2008 |
| CN | 201060659 Y | 5/2008 |
| EP | 1839951 A1 | 10/2007 |
| JP | 06239183 A * | 8/1994 |
| JP | 2002316594 A | 10/2002 |
| WO | 8801579 A1 | 3/1988 |

\* cited by examiner

CONNECTING DEVICE FOR MULTIFUNCTIONAL BOX AND VEHICLE COMPRISING THE SAME

CROSS-REFERENCE OF RELATED APPLICATIONS

The present application is a national phase entry under 35 U.S.C. §371 of International Application No. PCT/CN2011/070978 filed Feb. 14, 2011, published in English, which claims priority from Chinese Patent Application No. 201010114936.9, filed Feb. 21, 2010, all of which are incorporated herein by reference.

FIELD

The present disclosure relates to auxiliary vehicle equipment, more particularly, to an improved connecting device adapted for connecting a multifunctional box with a vehicle multimedia system as well as a vehicle comprising the same.

BACKGROUND

Vehicle electronic equipments, especially vehicle multimedia and audio equipments have been developed quickly in recent years, but some fashionable consumer electronic devices may still not be used in conventional vehicle due to the harsh application environment and rigorous technical requirements with a limited space in the conventional vehicle. There may be a demanding personal requirement from end users in future, for example, end users may also have different requirements for vehicle electronic equipments, especially for vehicle multimedia systems. However, it is hard for the vehicle to be installed with a vehicle multimedia system which includes all the functional components or devices required by users.

Presently, some companies have made some related researches and invented a vehicle multimedia system and a multifunctional box matched with the vehicle multimedia system. The multifunctional box is convenient to carry because the multifunctional box may be put in the vehicle multimedia system when the users get on the vehicle and the multifunctional box may be taken away when the users get off the vehicle, but how to realize quick and convenient connection and disconnection between the vehicle multimedia system in a vehicle and the multifunctional box still renders problems in the art.

SUMMARY

The present disclosure is directed to solve at least one of the problems existing in the prior art. Accordingly, a connecting device adapted for connecting a multifunctional box with a vehicle multimedia system may need to be provided, which may have excellent compatibility with reduced cost and may be convenient for usage and mass production. Further, a vehicle comprising the same may also need to be provided.

According to an aspect of the present disclosure, a connecting device adapted for connecting a multifunctional box with a vehicle multimedia system may be provided, comprising: a shell for holding the multifunctional box having a first open end portion and a second end portion configured with an interface, via which the multifunctional box is electrically connected with the vehicle multimedia system in a releasable manner; a locking unit formed on at least a lateral side between the first open portion and the second end portion for releasably locking the multifunctional box; and a release unit formed on the shell to release the inserted multifunctional box when pressed.

According to another aspect of the present disclosure, a vehicle may be provided, comprising: a vehicle body; a vehicle multimedia system provided on the vehicle body; and a connecting device as described above for accommodating a multifunctional box, which is provided on the vehicle body. The connecting device may be electrically connected with the vehicle multimedia system via the interface on the second end portion of the shell.

According to embodiments of the present disclosure, when put into the connecting device, the multifunctional box will be locked safely by the locking unit, and the vehicle multimedia system may be connected with the multifunctional box via the interface in the connecting device. When the multifunctional box is desired to be removed, the release unit is pressed so that the multifunctional box may be released easily. In addition, the connecting device may have a simplified structure which may be easy to manipulate. And the manufacture cost thereof is low. In addition, the connecting device is suitable for mass production.

Additional aspects and advantages of the embodiments of present disclosure will be given in part in the following descriptions, become apparent in part from the following descriptions, or be learned from the practice of the embodiments of the present disclosure.

BRIEF DESCRIPTION OF THE DRAWINGS

The foregoing and other features and advantages of the present disclosure will become apparent and more readily appreciated from the following descriptions taken in conjunction with the drawings in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

According to an aspect of the present disclosure, a connecting device adapted for connecting a multifunctional box with a vehicle multimedia system may be provided, comprising: a shell for holding the multifunctional box having a first open end portion and a second end portion configured with an interface, via which the multifunctional box may be electrically connected with the vehicle multimedia system in a releasable manner; a locking unit formed on at least a lateral side between the first open portion and the second end portion for releasably locking the multifunctional box; and a release unit formed on the shell to release the inserted multifunctional box when pressed.

According to embodiments of the present disclosure, when put into the connecting device, the multifunctional box will be locked safely by the locking unit, and the vehicle multimedia system may be connected with the multifunctional box via the interface in the connecting device. When the multifunctional box may be desired to be removed, the release unit may be pressed so that the multifunctional box may be released easily. In addition, the connecting device may have a simplified structure which may be easy to manipulate. And the manufacture cost thereof may be low. In addition, the connecting device may be suitable for mass production.

In the following, the connecting device according to an embodiment of the present disclosure will be described in detail with reference to the accompany figures.

As shown in FIGS. 1-4, the connecting device adapted for connecting a multifunctional box with a vehicle multimedia system may realize the convenient connection and disconnection between the vehicle multimedia system and the multifunctional box. One end of the multifunctional box 9 may be configured with an interface 91 which may be mated with an interface 151 on a second end portion 101 of the shell 1 to realize the connection between the multifunctional box 9 and the vehicle multimedia system. Also, when put into practice, the interface 151 may be connected with the vehicle multimedia system, which, for example, may be provided in a vehicle.

As shown in FIGS. 1-4, the connecting device comprises a shell 1, a locking unit and a release unit. The shell 1 for holding the multifunctional box 9 comprises an upper plate 11, a bottom plate 12, a left plate 13, a right plate 14 and a back plate 15, which may be configured to form a cavity for holding the multifunctional box 9. And the multifunctional box 9 may be inserted from the first open end portion 102. The back plate 15 on a back part of the shell 1 may be configured with an interface 151. The interface 151 may be connected with a PCB board, which may be electrically connected with the vehicle multimedia system. When the interface 91 is connected with the interface 151, the connection between the multifunctional box 9 and the vehicle multimedia system may be realized accordingly.

As shown in FIGS. 1-4, in some embodiments, there may be two locking units and two release units, which may be disposed separately on both sides of the shell 1. The structure and the working process of the locking units and the release units on both sides of the shell 1 may be substantially the same. Therefore, only the locking unit and the release unit disposed on the left side of the shell 1 may be described in detail for clarity.

Figure 1:
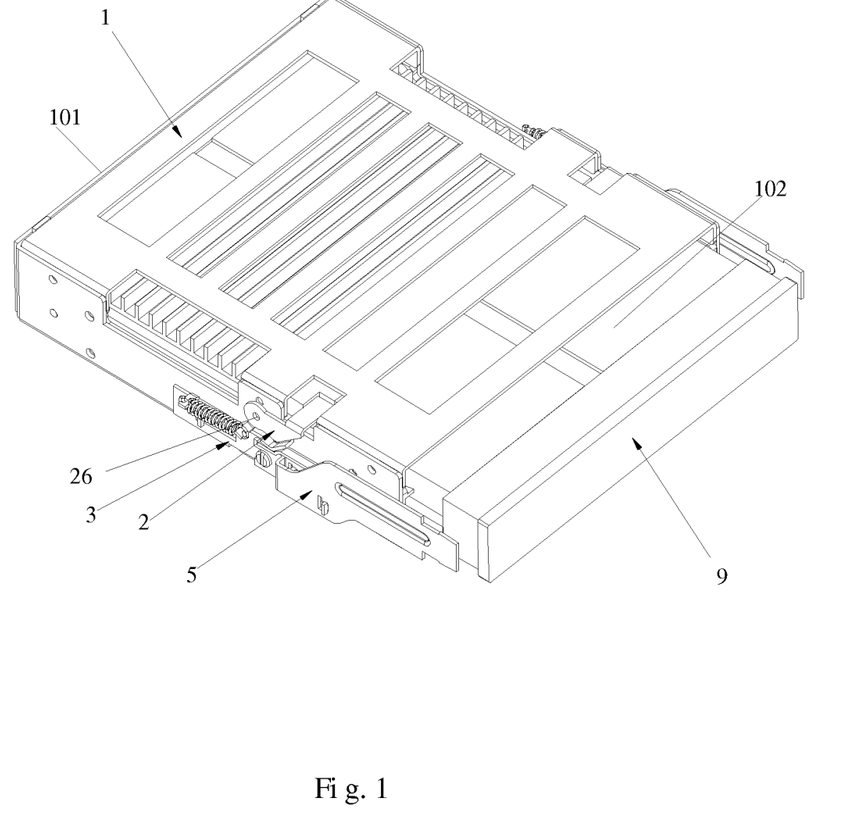
FIG. 1 is a perspective view of a connecting device with a multifunctional box being inserted therein according to an embodiment of the present disclosure.
Figure 2:
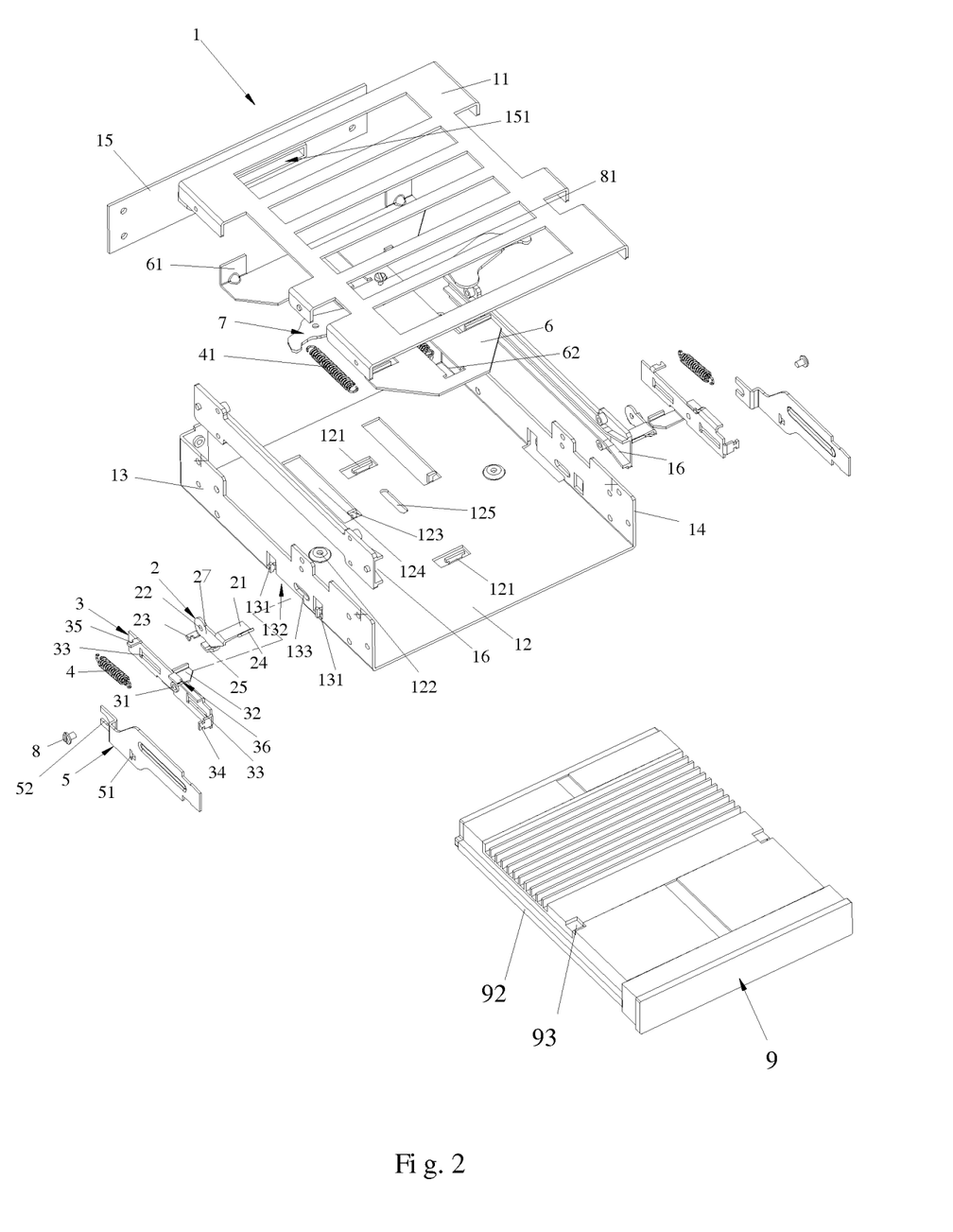
FIG. 2 is an exploded perspective view of a connecting device according to an embodiment of the present disclosure, in which a multifunctional box is separately shown.
Figure 3:
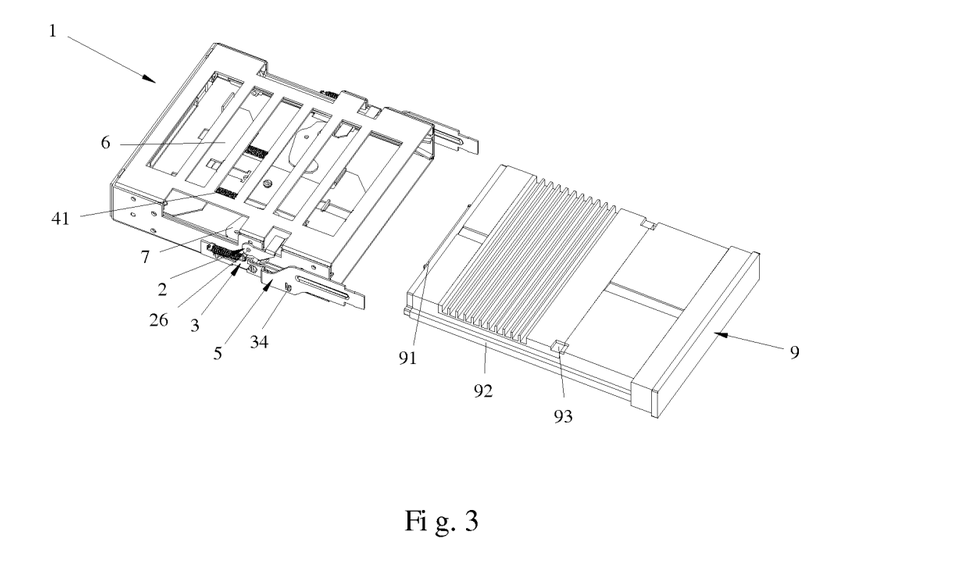
FIG. 3 is a perspective view of a connecting device before a multifunctional box is inserted therein according to an embodiment of the present disclosure.

In some embodiments, the multifunctional box 9 may be formed with a groove portion 93. As shown in FIGS. 2-3, in one embodiment, the multifunctional box 9 may be formed with two groove portions 93 disposed on both lateral sides of the multifunctional box 9 respectively. The locking unit locks the multifunctional box 9 in the shell 1 by the groove portions 93.

Figure 4:
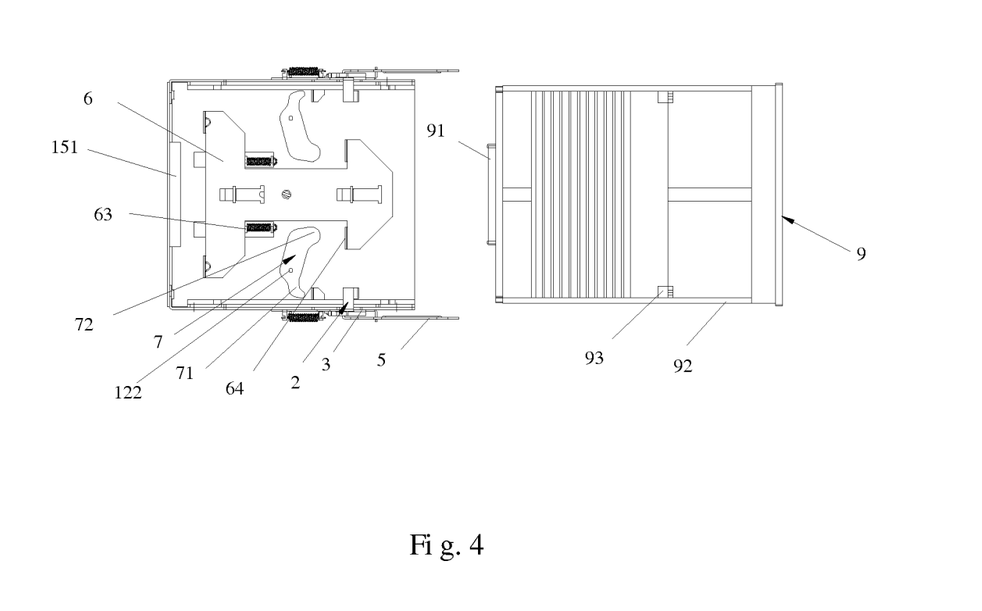
FIG. 4 is a schematic plan view of FIG. 3 with an ejecting assembly being shown.
Figure 5:
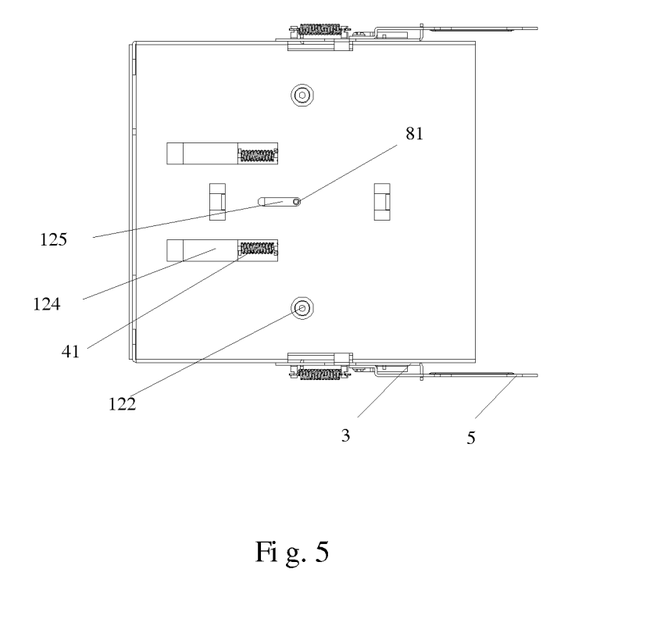
FIG. 5 is a schematic bottom view of a connecting device according to an embodiment of the present disclosure.
Figure 6:
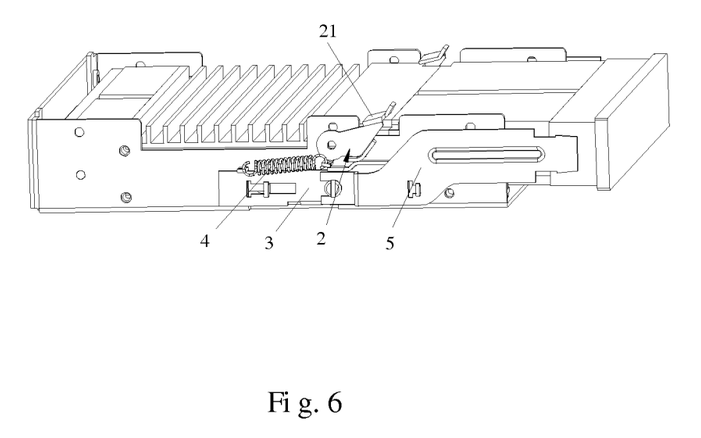
FIG. 6 is a perspective view of a connecting device when a multifunctional box is unlocked from the connecting device according to an embodiment of the present disclosure.
Figure 7:
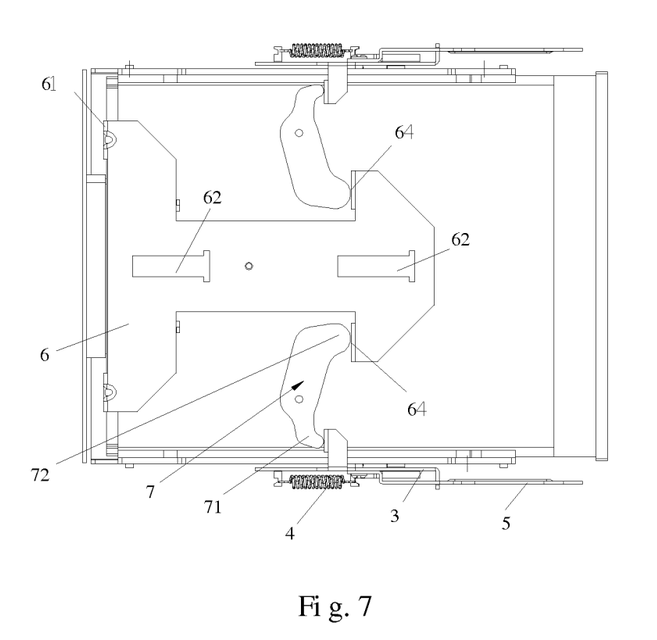
FIG. 7 is a schematic plan view of a connecting device during unlocking according to an embodiment of the present disclosure.
Figure 8:
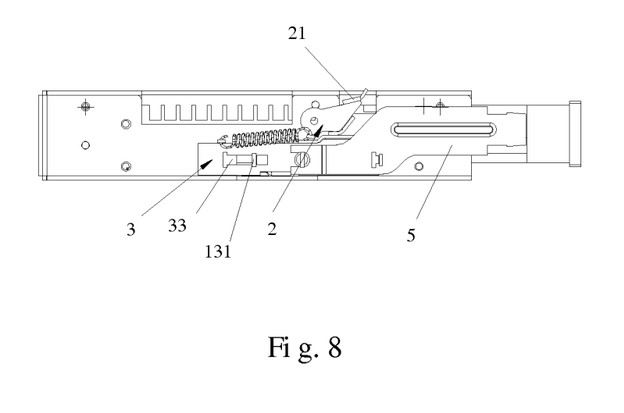
FIG. 8 is a left side view of a connecting device when a pressing plate therein is pressed according to an embodiment of the present disclosure
Figure 9:
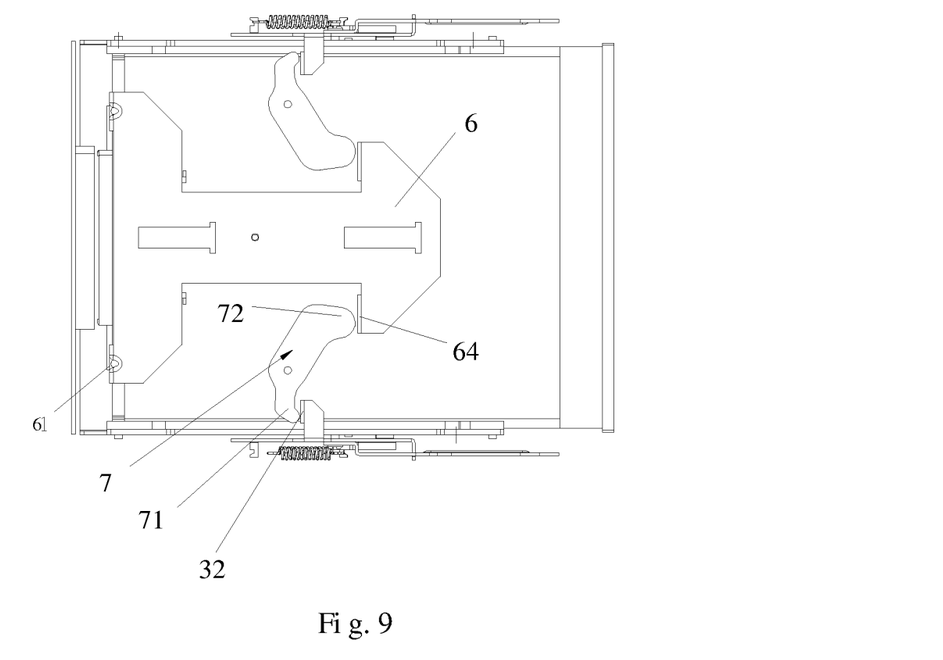
FIG. 9 is a schematic plan view of a connecting device when the pressing plate is pressed according to an embodiment of the present disclosure.
Figure 10:
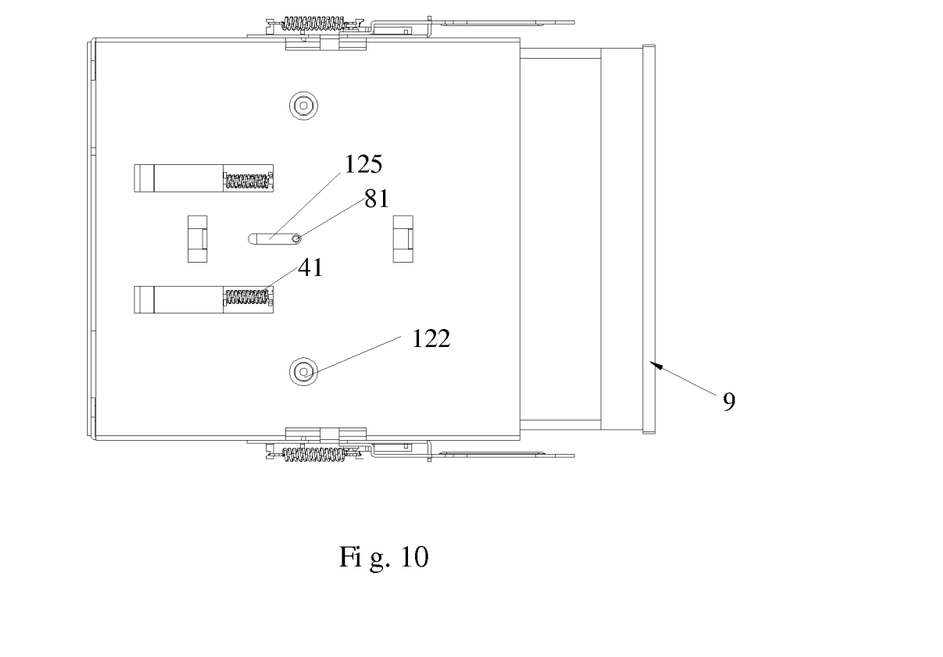
FIG. 10 is a schematic bottom view of a connecting device when a multifunctional box is ejected from the connecting device according to an embodiment of the present disclosure.
Figure 11:
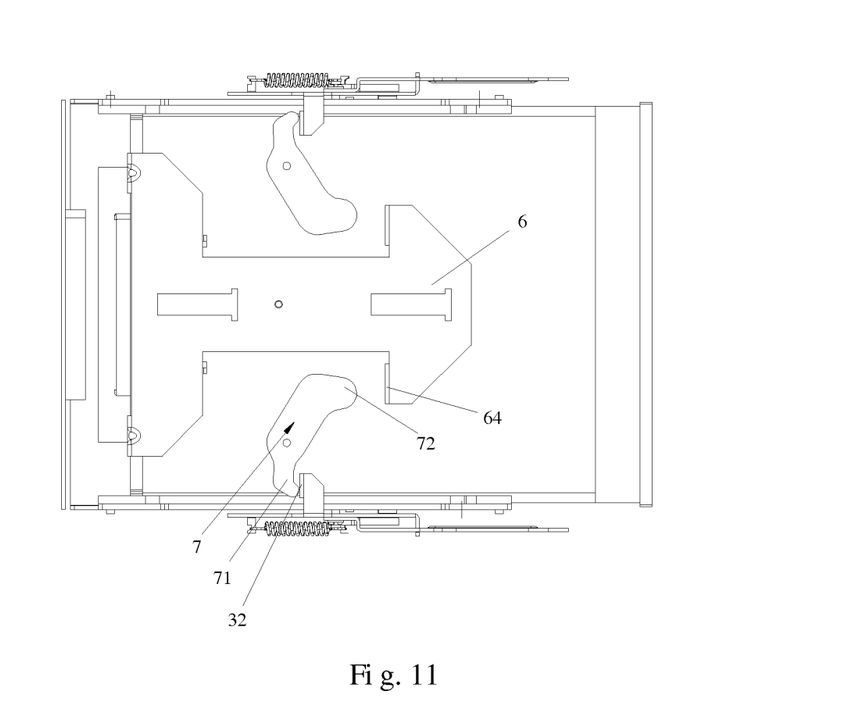
FIG. 11 is a schematic plan view of a connecting device when a multifunctional box is ejected from the connecting device according to an embodiment of the present disclosure.

As shown in FIGS. 2-4, the locking unit comprises: a locking plate 2 having a first lateral side portion 27 pivotably mounted on the lateral side and a horizontal projecting portion 21 formed at a free end of the first lateral side portion 27 extending horizontally into the shell 1 for locking the groove portion 93 when the multifunctional box 9 is placed in position; and a first elastic element 4 with an end connected with the first lateral side portion 27 and the other end connected with the release unit which may be elastically elongated when the release unit is pressed.

Particularly, as shown in FIGS. 2-4, the locking unit comprises the locking plate 2 and the first elastic element which, for example, may be a first spring 4. The locking plate 2 comprises a horizontal projecting portion 21, a first projecting portion 24 and a second projecting portion 25. A circular hole 22 may be also disposed in the locking plate 2, and a screw 26 may be penetrated through the circular hole 22 to fix the locking plate 2 in the left plate 13, so that the locking plate 2 may be pivotably moved around the screw 26. And an unlocking plate 3 may be provided immediately below the locking plate 2, and the locking plate 2 may be driven by the unlocking plate 3 to be rotated accordingly. The unlocking plate 3 may be moved along the lateral side back and forth.

In some embodiments, the horizontal projecting portion 21 has an upwardly curved first projecting portion 24 facing away from the first open end portion 102. As shown in FIGS. 2-4, the first projecting portion 24 may be projected from the horizontal projecting portion 21, one end of the first spring 4 may be fixed in a spring installation portion 23 of the locking plate 2, and the other end of the first spring 4 may be fixed in a spring installation portion 35 of the unlocking plate 3. When the multifunctional box 9 is inserted in the shell 1, the front end of the multifunctional box 9 pushes the first projecting portion 24, so that the first projecting portion 24 may be raised due to the curvature thereof and the multifunctional box 9 may be inserted into the shell 1 with the horizontal projecting portion 21 being smoothly sliding on an upper surface of the multifunctional box 9. During the inserting, the locking plate 2 rotates upward around the screw 26, and the first spring 4 may be deformed due to the rotation of the locking plate 2. When the multifunctional box 9 is pushed to the back plate 15, the interface 91 may be matched tightly with the interface 151. Meanwhile, the groove portions 93 move to the position where the horizontal projecting portion 21 of the locking plate 2 may be located, then the horizontal projecting portion 21 locks the groove portions 93 under the restoring force of the first spring 4, so that the multifunctional box 9 may be locked in the shell 1 by the locking plate 2. In this way, the connection between the multifunctional box 9 and the vehicle multimedia system may be realized.

In some embodiments, the release unit comprises: an unlocking plate 3 which may be movable along the lateral side with an end connected with the other end of the first elastic element 4; and a pressing plate 5 projecting out of the shell 1 which may be fixed with the unlocking plate 3.

As shown in FIGS. 1-4, the release unit may comprise the unlocking plate 3 and the pressing plate 5. The unlocking plate 3 may be provided with two locking grooves 33 which may be matched movably with two locking pins 131 formed on the left plate 13 respectively. When the unlocking plate 3 is mounted on the left plate 13, the unlocking plate 3 may be moved in a straight line along the locking pins 131.

As shown in FIGS. 1-4, the pressing plate 5 may be fixedly connected with the unlocking plate 3. Particularly, the pressing plate 5 may be formed with a locking groove 51, and the unlocking plate 3 may be formed with a locking pin 34, so that the pressing plate 5 may be connected with the unlocking plate 3 through the locking groove 51 and the locking pin 34. The lateral side may be formed with a first waist shaped hole 133, and the pressing plate 5 may be fixed with the unlocking plate 3 via a first screw 8 with a free end thereof being projecting into the first waist shaped hole 133 so that the pressing plate 5 may be movable within a first predetermined distance. One end of the pressing plate 5 may be provided with a mounting hole 52 and the unlocking plate 3 may be provided with a threaded hole 31, the first screw 8 may be penetrated through the mounting hole 52 and connected with the threaded hole 31 of the unlocking plate 3, and the front end of the first screw 8 may be projected from the unlocking plate 3 and projected into a first waist shaped hole 133 which may be formed in the left plate 13.

In some embodiments, the first lateral side portion 27 may be formed with a second projecting portion 25 extending horizontally from a lower part thereof, and the unlocking plate 3 may be formed with a third projecting portion 36 facing toward the second projecting portion 25 which may be configured to raise the horizontal projecting portion 21 when the pressing plate 5 is pressed at a free end thereof and the second projecting portion 25 contacts with the third projecting portion 36.

As shown in FIG. 2, the locking plate 3 may be formed with a third projecting portion 36 and a fourth projecting portion 32. The third projecting portion 36 may be disposed in an upper part of the locking plate 3, and the fourth projecting portion 32 may be disposed in a lower part of the locking plate 3. The fourth projecting portion 32 passes through a through groove 132 on the left plate 13 and may be configured to move in a length direction of the through-groove 132. When the pressing plate 5 may be pressed, it moves together with the unlocking plate 3, and the third projecting portion 36 pushes the second projecting portion 25 to move upwards accordingly, and the locking plate 2 rotates upwardly around the screw 26, then the horizontal projecting portion 21 on the locking plate 2 leaves the groove portions 93, thus unlocking the multifunctional box 9.

In some embodiments, the connecting device may further comprise an ejecting assembly provided on an inner bottom surface of the shell 1. The ejecting assembly may comprise a pushing plate 6 movable in a direction in parallel with the lateral side, upon which the inserted multifunctional box 9 may be accommodated; and at least a second elastic element connected between the inner bottom surface and a first portion of the pushing plate 6, the second elastic element being accommodated in a groove 124 formed in the inner bottom surface, and the second elastic element being depressed when the multifunctional box 9 may be inserted into the shell 1.

In some embodiments, as shown in FIG. 3, the ejecting assembly may comprise two second elastic elements connected between the inner bottom surface and a portion of the pushing plate 6. In some embodiments, the pushing plate 6 may be formed with a guide hole 62, and the inner bottom surface may be formed with a vertical pin 121 which may be inserted through the guide hole 62. In some embodiments, the inner bottom surface may be formed with a second waist shaped hole 125, and the pushing plate 6 may be movable along the second waist shaped hole 125 within a second predetermined distance via a second screw 81 with a free end thereof being projecting into the second waist shaped hole 125.

As shown in FIG. 2 and FIG. 4, the ejecting assembly may comprise at least a second elastic element and a pushing plate 6. The pushing plate 6 may be a flat plate with a backstop portion 61 formed on one end thereof and a pushing portion 64 formed in the middle thereof. The pushing plate 6 may be also formed with a guide hole 62. When the guide hole 62 is installed on a vertical pin 121 disposed on the bottom plate 12, the pushing plate 6 may move along the vertical pin 121.

As shown in FIGS. 1-4, the second elastic element may be a second spring 41 disposed in a square groove 124 formed in the bottom plate 12, one end of the second spring 41 may be connected with a spring installation portion 123 formed on the inner bottom surface of the shell 1, and the other end of the second spring 41 may be connected with a spring installation portion 63 on the pushing plate 6. The multifunctional box 9 may be disposed on the pushing plate 6 when it is placed in the shell 1. When the multifunctional box 9 is pushed to move toward the back plate 15 of the shell 1, the front end of multifunctional box 9 pushes the backstop portion 61 of the pushing plate 6 to move together, and the second spring 41 may be deformed due to spring extension and may be deformed maximally when the multifunctional box 9 is locked by the locking plate 3. When the locking plate 3 unlocks the multifunctional box 9, the second spring 41 may be restored and both the pushing plate 6 and the multifunctional box 9 may be ejected out accordingly.

Further, under some conditions, the elastic force provided by the second spring 41 alone may not be enough to overcome the friction force between the interface 91 and the interface 151, so the multifunctional box 9 may not be ejected out easily. Therefore, an auxiliary ejecting unit may be additionally provided in the inner bottom surface. The auxiliary ejecting unit may comprise a lever 7 rotatably fixed to the inner bottom surface of the shell 1; and a fourth projecting portion 32 horizontally extended from the lower portion of the unlocking plate 3 inside the shell 1. The lever 7 may be configured to press against the second projecting portion 25 and a second portion of the pushing plate 6 when the pressing plate 5 is pressed, and the lever 7 has a first arm 71 of the lever 7 close to the second projecting portion 25 shorter than a second arm 72 of the lever 7 close to the second portion of the pushing plate 6. The lever 7 may be riveted in the bottom plate 12 by a rivet 122 and rotates around the rivet 122.

As shown in FIGS. 5-11, when the user wants to take the multifunctional box 9 out of the shell 1, he may press the pressing plate 5 so as to push the unlocking plate 3 to move leftwards. The third projecting portion 36 of the unlocking plate 3 firstly unlocks the locking plate 2, then the unlocking plate 3 continues moving leftwards to make the fourth projecting portion 32 push a first end 71 of the lever 7, and the lever 7 rotates around the rivet 122 until the other end 72 of the lever 7 pushes the pushing portion 64 of the pushing plate 6 and the pushing plate 6 may be ejected out by the enlarged force created by the lever 7. The pushing force of the lever 7 may be much larger than the friction force between the interface 91 and the interface 151, so the interface 91 may be detached from the interface 151. The elastic force provided by the second spring 41 when it is restored may be much larger than the friction force between the multifunctional box 9 and the shell 1, the multifunctional box 9 may be ejected out by the second spring 41. When the multifunctional box 9 is taken away, every part of the shell 1 restores into initial state respectively.

Figure 12:
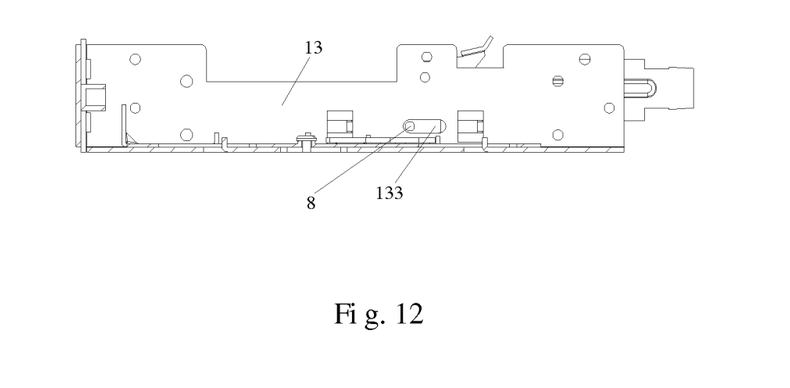
FIG. 12 is a left side view of a connecting device without a multifunctional box according to an embodiment of the present disclosure.

As shown in FIG. 2 and FIG. 12, the left plate 13 and the bottom plate 12 may be provided with a first waist shaped hole 133 and a second waist shaped hole 125 respectively. The first screw 8 may be fixedly connected with the unlocking plate 3 and the pressing plate 5, and the front end of the first screw 8 may be projected from the unlocking plate 3 and projected into the first waist shaped hole 133. A second screw 81 may be fixedly connected with the pushing plate 6, and the front end of the second screw 81 may be projected from the pushing plate 6 and projected into the second waist shaped hole 125. As shown in FIG. 12, the pressing plate 5 and the unlocking plate 3 may only move within the area of the first waist shaped hole 133 due to the limitation of the first screw 8. The first screw 8 may be also configured to limit the moving area of the unlocking plate 3 to prevent it from getting out of the locking pin 131. The second screw 81 may be configured not only to limit the moving area of the pushing plate 6 in the second waist shaped hole 125 but also to prevent the pushing plate 6 from getting out of the vertical pin 121.

The locking unit and the release unit disposed on the left side of the shell 1 may be described above. Because the locking unit and the release unit disposed on the right side of the shell 1 may be the same as the locking unit and the release unit disposed on the left side of the shell 1, so it will not be described hereinafter in detail for clarity. Because both sides of the shell 1 may be provided with the locking unit and the release unit respectively, the multifunctional box 9 with enhanced locking and unlocking may be realized and the misoperation of the user may be effectively avoided. Particularly, when the user accidentally presses the pressing plate 5 on one side of the shell 1 and one locking plate 2 may be unlocked, the multifunctional box 9 may not be ejected from the shell 1 because another locking plate 2 on the other side of the shell 1 still locks the multifunctional box 9. Therefore, only when the pressing plates 5 on two sides of the shell 1 may be pushed simultaneously, the multifunctional box 9 may be ejected from the shell 1.

In some embodiments, each lateral side may be formed with a guide groove 16 mating with a projecting rib 92 formed on each side of the multifunctional box 9 respectively.

As shown in FIG. 2 and FIG. 3, each inner sidewall of the shell 1 may be formed with a guide groove 16, and each side of the multifunctional box 9 may be also configured with a projecting rib 92 to match the guide groove 16. The friction force may be small because the multifunctional box 9 may be sliding along the guide groove 16 when it moves in the shell 1.

According to another aspect of the present disclosure, a vehicle may be provided, which may comprise: a vehicle body (not shown); a vehicle multimedia system provided on the vehicle body; and a connecting device as described above for accommodating the multifunctional box 9, which may be provided on the vehicle body. The connecting device may be electrically connected with the vehicle multimedia system via the interface on the second end portion of the shell.

Although explanatory embodiments have been shown and described, it would be appreciated by those skilled in the art that changes, alternatives, and modifications can be made in the embodiments without departing from spirit and principles of the present disclosure. Such changes, alternatives, and modifications all fall into the scope of the claims and their equivalents.

What is claimed is:

1. A connecting device adapted for connecting a multifunctional box with a vehicle multimedia system, comprising:
    a shell for holding the multifunctional box having a first open end portion and a second end portion configured with an interface, via which the multifunctional box is electrically connected with the vehicle multimedia system in a releasable manner;
    a locking unit formed on at least a lateral side between the first open portion and the second end portion for releasably locking the multifunctional box;
    a release unit formed on the shell for releasing the inserted multifunctional box when pressed; and
    an ejecting assembly provided on an inner bottom surface or the shell having:
        a pushing plate movable in a direction in parallel with the lateral side, upon which the inserted multifunctional box is accommodated;
        at least a second elastic element connected between the inner bottom surface and a first portion of the pushing plate, the second elastic element being accommodated in a groove formed in the inner bottom surface, and the second elastic element being depressed when the multifunctional box is inserted into the shell,
    wherein the multifunctional box is formed with a groove portion, and the locking unit comprises:
        a locking plate having a first lateral side portion pivotably mounted on the lateral side and a horizontal projecting portion formed at a free end of the first lateral side portion extending horizontally into the shell for locking with the groove portion when the multifunctional box is placed in position;
        a first elastic element with an end being connected with the first lateral side portion and the other end being connected with the release unit which is elastically elongated when the release unit is pressed,
    wherein the release unit comprises:
        an unlocking plate which is movable along the lateral side with an end connected with the other end of the first elastic element;
        a pressing plate projecting out of the shell which is fixed with the unlocking plate.

2. The connecting device according to claim 1, wherein the lateral side is formed with a first waist shaped hole, and the pressing plate is fixed with the unlocking plate via a first screw with a free end thereof being projecting into the first waist shaped hole so that the pressing plate is movable within a first predetermined distance.

3. The connecting device according to claim 2, wherein the first lateral side portion is formed with a second projecting portion extending horizontally from a lower part thereof, and the unlocking plate is formed with a third projecting portion facing toward the second projecting portion which is configured to raise the horizontal projecting portion when the pressing plate is pressed at a free end thereof and the second projecting portion contacts with the third projecting portion.

4. The connecting device according to claim 1, wherein the ejecting assembly comprises two second elastic elements connected between the inner bottom surface and a portion of the pushing plate.

5. The connecting device according to claim 4, wherein the pushing plate is formed with a guide hole, and the inner bottom surface is formed with a vertical pin which is inserted through the guide hole.

6. The connecting device according to claim 5, wherein the inner bottom surface is formed with a second waist shaped hole, and the pushing plate is movable along the second waist shaped hole within a second predetermined distance via a second screw with a free end thereof being projecting into the second waist shaped hole.

7. The connecting device according to claim 6, wherein the ejecting assembly further comprises an auxiliary ejecting unit having:
   a lever rotatably fixed to the inner bottom surface of the shell; and
   a fourth projecting portion horizontally extended from the lower portion of the unlocking plate inside the shell, wherein the lever is configured to press against the second projecting portion and a second portion of the pushing plate when the pressing plate is pressed, and the lever has a first arm of the lever close to the second projecting portion shorter than a second arm of the lever close to the second portion of the pushing plate.

8. A vehicle, comprising:
   a vehicle body;
   a vehicle multimedia system provided on the vehicle body; and
   a connecting device according to claim 1 for accommodating a multifunctional box, which is provided on the vehicle body, wherein the connecting device is electrically connected with the vehicle multimedia system via the interface on the second end portion of the shell.

9. The connecting device according to claim 1, wherein each lateral side is provided with the locking unit and the release unit respectively.

10. A connecting device adapted for connecting a multifunctional box with a vehicle multimedia system, comprising:
    a shell for holding the multifunctional box having a first open end portion and a second end portion configured with an interface, via which the multifunctional box is electrically connected with the vehicle multimedia system in a releasable manner;
    a locking unit formed on at least a lateral side between the first open portion and the second end portion for releasably locking the multifunctional box;
    a release unit formed on the shell for releasing the inserted multifunctional box when pressed; and
    an ejecting assembly provided on an inner bottom surface of the shell, having:
       a pushing plate movable in a direction in parallel with the lateral side, upon which the inserted multifunctional box is accommodated;
       at least a second elastic element connected between the inner bottom surface and a first portion of the pushing plate, the second elastic element being accommodated in a groove formed in the inner bottom surface, and the second elastic element being depressed when the multifunctional box is inserted into the shell.

11. The connecting device according to claim 10, wherein the multifunctional box is formed with a groove portion, and the locking unit comprises:
    a locking plate having a first lateral side portion pivotably mounted on the lateral side and a horizontal projecting portion formed at a free end of the first lateral side portion extending horizontally into the shell for locking with the groove portion when the multifunctional box is placed in position; and
    a first elastic element with an end being connected with the first lateral side portion and the other end being connected with the release unit which is elastically elongated when the release unit is pressed.

12. The connecting device according to claim 11 wherein the release unit comprises:
    an unlocking plate which is movable along the lateral side with an end connected with the other end of the first elastic element; and
    a pressing plate projecting out of the shell which is fixed with the unlocking plate.

13. The connecting device according to claim 12, wherein the lateral side is formed with a first waist shaped hole, and the pressing plate is fixed with the unlocking plate via a first screw with a free end thereof being projecting into the first waist shaped hole so that the pressing plate is movable within a first predetermined distance.

14. The connecting device according to claim 13, wherein the first lateral side portion is formed with a second projecting portion extending horizontally from a lower part thereof, and the unlocking plate is formed with a third projecting portion facing toward the second projecting portion which is configured to raise the horizontal projecting portion when the pressing plate is pressed at a free end thereof and the second projecting portion contacts with the third projecting portion.

15. The connecting device according to claim 11, wherein the horizontal projecting portion has an upwardly curved surface facing away from the first open end.

16. The connecting device according to claim 11 wherein each lateral side is formed with a guide groove mating with a projecting rib formed on each side of the multifunctional box respectively.

17. The connecting device according to claim 10, wherein the ejecting assembly comprises two second elastic elements connected between the inner bottom surface and a portion of the pushing plate.

18. The connecting device according to claim 17, wherein the pushing plate is formed with a guide hole, and the inner bottom surface is formed with a vertical pin which is inserted through the guide hole.

19. The connecting device according to claim 18, wherein the inner bottom surface is formed with a second waist shaped hole, and the pushing plate is movable along the second waist shaped hole within a second predetermined distance via a second screw with a free end thereof being projecting into the second waist shaped hole.

20. The connecting device according to claim 19, wherein the ejecting assembly further comprises an auxiliary ejecting unit having:
    a lever rotatably fixed to the inner bottom surface of the shell; and
    a fourth projecting portion horizontally extended from the lower portion of the unlocking plate inside the shell, wherein the lever is configured to press against the second projecting portion and a second portion of the pushing plate when the pressing plate is pressed, and the lever has a first arm of the lever close to the second projecting portion shorter than a second arm of the lever close to the second portion of the pushing plate.

* * * * *